Aug. 18, 1953     K. B. MacDOUGALL     2,648,996
AUTOMATIC SLACK ADJUSTING MECHANISM
Filed Nov. 8, 1950     4 Sheets-Sheet 3
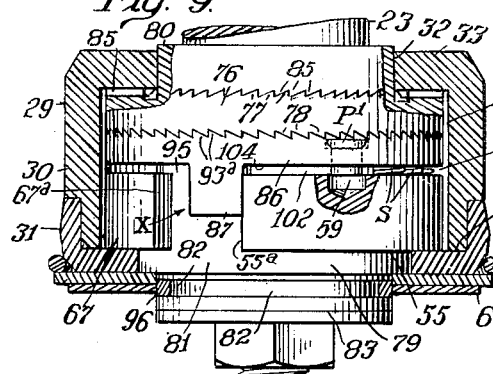
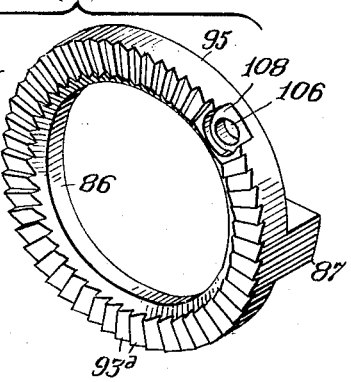
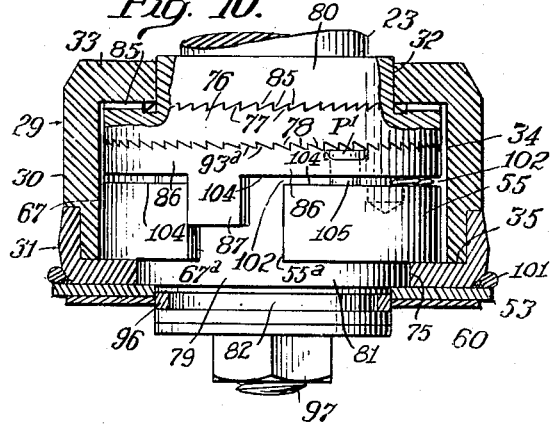
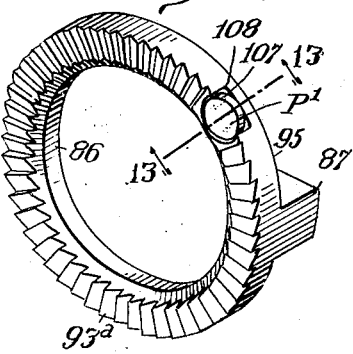
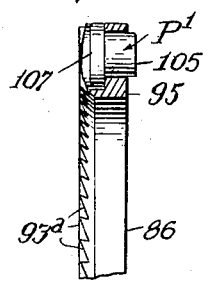
INVENTOR
*Kirkland B. MacDougall*
BY *Shoemaker & Mattare*
ATTORNEYS Aug. 18, 1953 K. B. MacDOUGALL 2,648,996
AUTOMATIC SLACK ADJUSTING MECHANISM
Filed Nov. 8, 1950 4 Sheets-Sheet 4
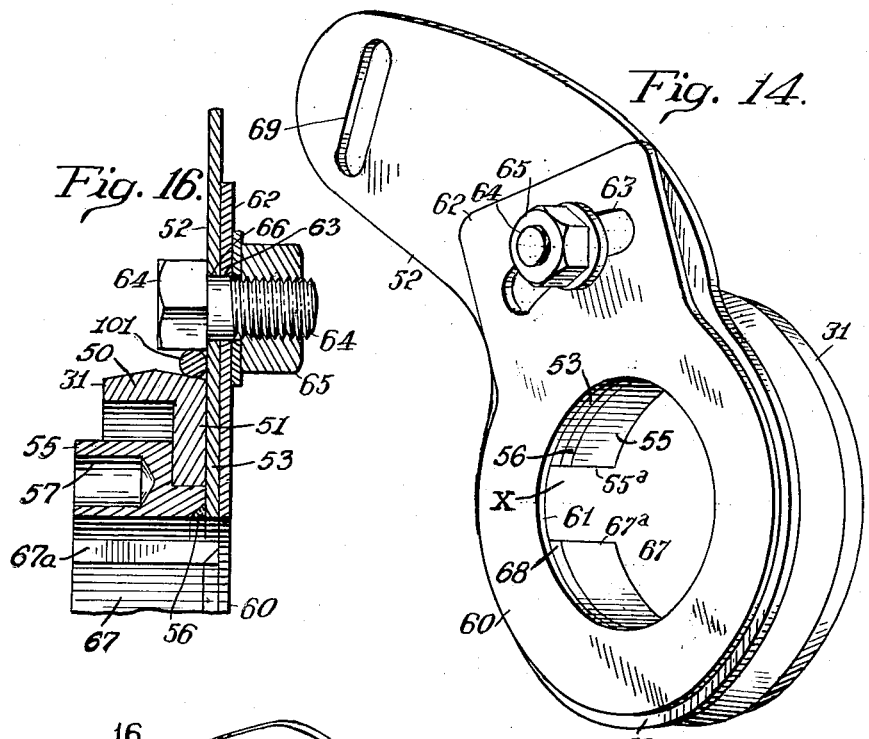
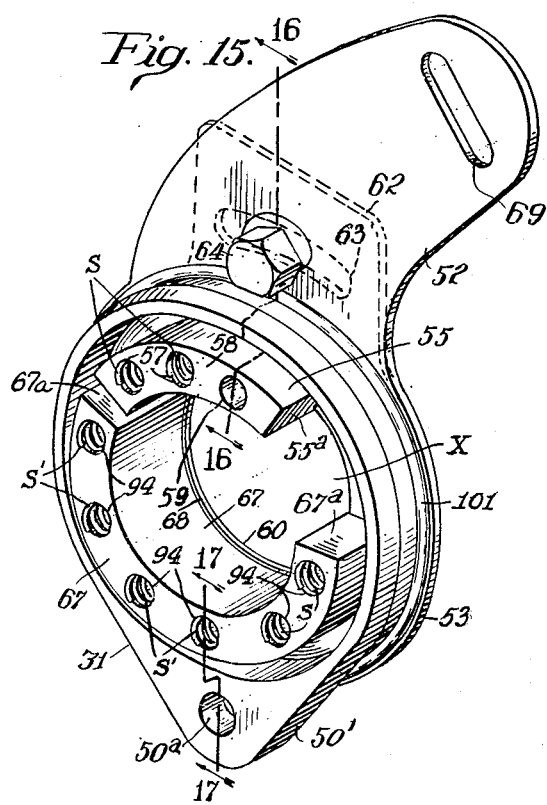
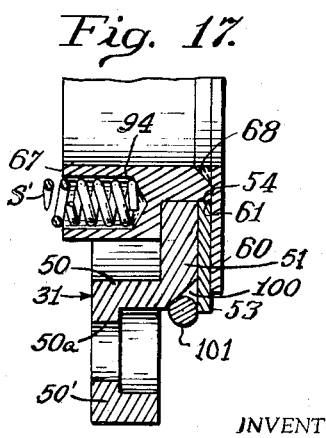
INVENTOR
Kirkland B. MacDougall
BY Shoemaker & Mattare
ATTORNEYS Patented Aug. 18, 1953

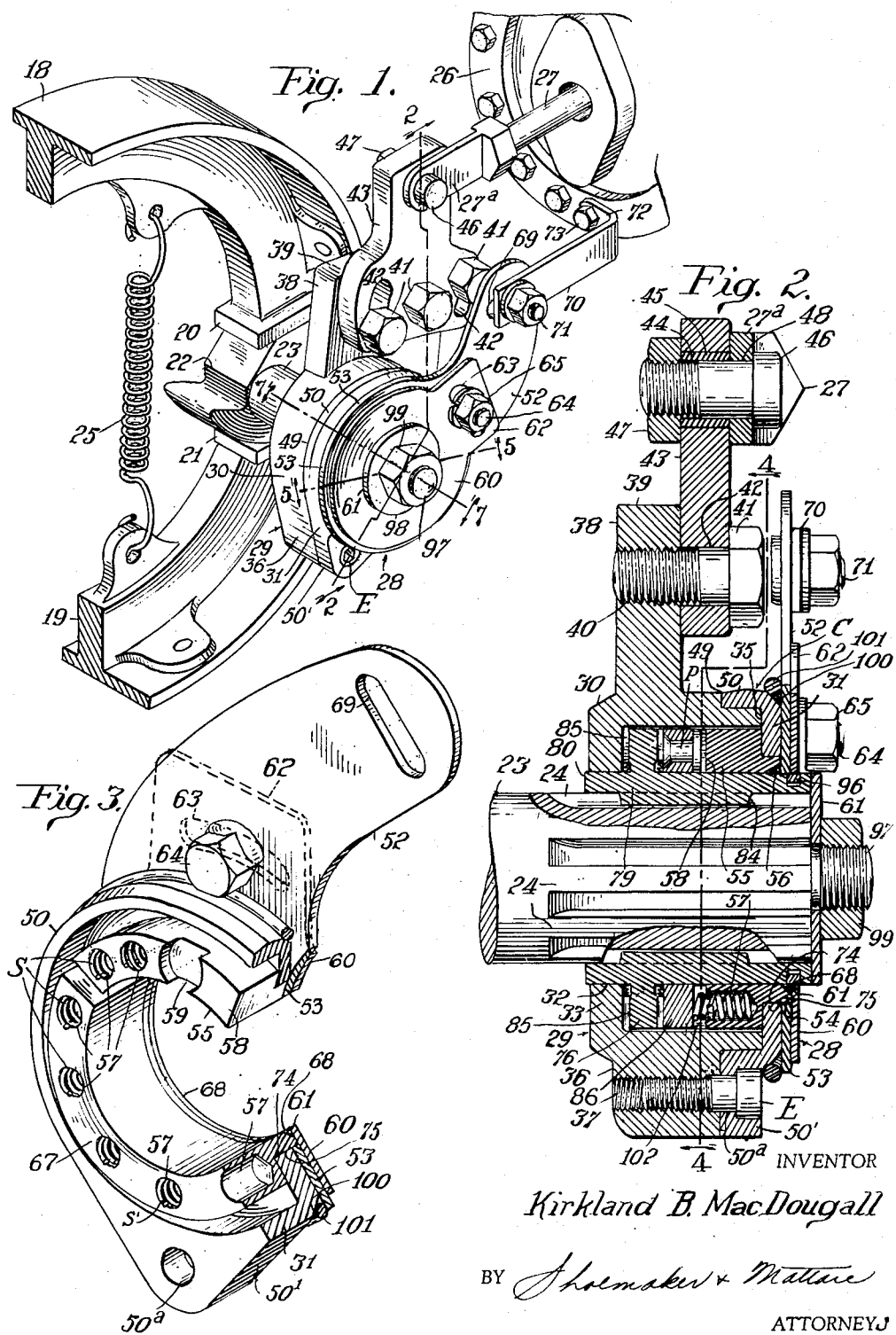

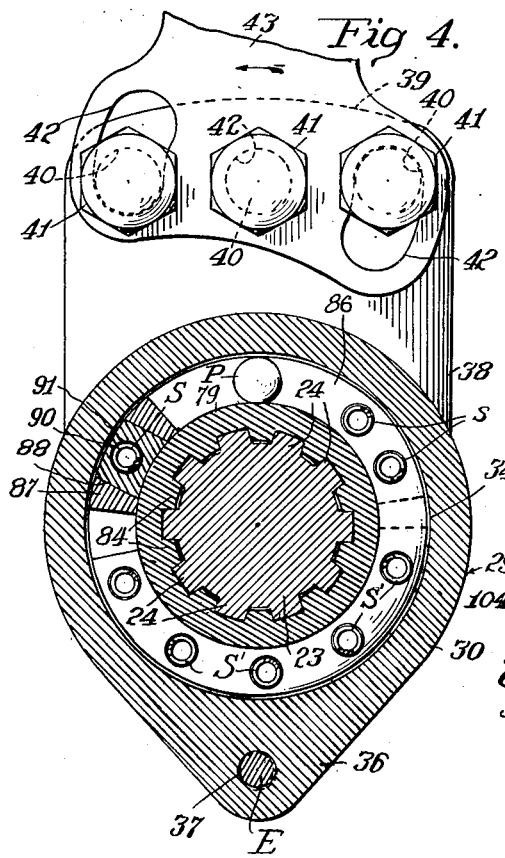

2,648,996

UNITED STATES PATENT OFFICE 2,648,996

AUTOMATIC SLACK ADJUSTING MECHANISM

Kirkland B. MacDougall, Benton, Pa.

Application November 8, 1950, Serial No. 194,658

6 Claims. (Cl. 74—522)

This invention relates to automatic adjusting mechanism or devices. The adjusting devices are particularly adapted for brakes of automotive vehicles such as trucks, buses, trailer trucks, etc.

The adjusting devices are self-contained and unitary and are adapted to be associated with each of the brake bands of the brakes of the vehicle. Each device is actually mounted on and carried by the cam shaft of the braking mechanism and is adapted to automatically properly adjust each of the brake bands of the braking system of the vehicle individually when wear has occurred and the adjustment in this connection is positive and means are provided so that, automatically, an adjustment of the brake bands will be prevented unless actual wear of one or more of the bands of the brakes of the vehicle has occurred. Each of the adjusting devices is so constructed that the adjusting cycle of the brakes is prevented when the brakes are in a braking position.

Additionally, there is provided an adjusting feature of the device that provides for automatic brake adjustment with predetermined amounts of travel of a power arm of a pneumatic cylinder or the like, and when the various component parts comprising the device are automatically securely held in their proper position and cooperative relationship with each other. Additionally, the device is such that the timing cycle of events leading up to and including the automatic adjustment of the brakes is such that the same will occur at the proper time throughout the braking stroke and return or releasing stroke. Additionally, the device is so constructed as regards its exterior casing so as to prevent the escape of lubricant and the entrance of dirt and water and other detrimental media into the same.

There are some so-called automatic brake adjusting mechanisms or devices in the prior art which operate fairly satisfactorily but which do not embody structural characteristics and component cooperating elements so as to attain the beneficial and efficacious results as set forth herein with respect to the present invention.

In the present invention, the device is so constructed and the component elements are so arranged in their cooperative relationship that, if the cam shaft should fail to return to a released position, novel means is provided to prevent the return or operation of the device. If this prevention of the return of the adjuster or device were not provided for, under the circumstances, there would be a false adjustment of the brakes and the same would be tightened and probably prevent the movement of the vehicle. This is an important feature of the present invention and something that is not provided for in the prior art devices.

The present invention is an improvement of automatic adjusters for the brakes of automotive vehicles and an improvement on the adjusting device or mechanism shown in my Patent 2,481,319, September 6, 1949.

In the present invention, the component and cooperating elements constituting the same are such that the device itself can be preset to accommodate the same to the particular type of vehicle and the particular power stroke that is to be applied to the device for its proper functioning in automatically adjusting the brakes and, additionally, the device is subject to an exterior adjustment to rearrange or move certain of the component elements relative to others so that the presetting may be readily accomplished whether or not the device has actually been applied to the cam shaft of the brake operating mechanism.

In view of the foregoing, it is, therefore, an object of the present invention to provide an automatically operating adjusting device for automotive vehicles wherein the device will be prevented from indexing when the cam shaft which operates the brake bands or the like is in a forward or braking position.

Another object of the invention is to provide a completely automatically operating automotive brake adjusting device which is relatively simple as regards the structural features thereof and can be manufactured economically and readily applied to the cam shaft that operates the brakes and preset or adjusted to properly and efficiently perform its adjusting function under all and varying conditions that may exist with different types of automotive vehicles.

Another object of the invention is to provide a brake adjusting device carrying exterior means for adjustment of the various amounts of travel of the power arm which operates the device when it is mounted on the cam shaft that operates the brake—the amount of travel of the power arm adjusted—and the provision of means for securely maintaining the adjusted means in position once having been properly located.

Another object of the invention is to provide in a device of the character set forth suitable means for timing the cycle of events leading up to and including adjustment of the brakes or brake so that the same will occur at the proper time throughout the braking stroke and the return or release stroke or position.

Another object of the invention is to provide a unitary and self-contained device wherein the majority of the component elements thereof are encased and the escape of lubricant therefrom and the entrance of water, dirt and other deleterious matter thereinto are prevented.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a perspective view showing the brake adjusting device in its operative relationship with the power cylinder and the brake shoes of the vehicle;

Fig. 2 is a sectional view taken substantially along the lines 2—2 of Fig. 1, looking in the direction of the arrows;

Fig. 3 is a view in perspective of the cover or closure for the device with a part thereof broken away to show detail construction;

Fig. 4 is a view of the casing of the device partly in vertical section and partly in fragmentary elevation;

Fig. 5 is a longitudinal sectional view taken substantially along the lines 5—5 of Fig. 1, looking in the direction of the arrows and showing the adjuster in a released position;

Fig. 6 is a view similar to Fig. 5 but showing the component parts in their braking position;

Fig. 7 is a sectional view taken substantially along the line 7—7 of Fig. 1 showing the device in section and the cam shaft motor in elevation;

Fig. 8 is a perspective view of a ratcheting gear and hub structure;

Figs. 9 and 10 are views similar to Figs. 5 and 6 but showing a slight modification or variation of the invention;

Fig. 11 is a perspective view of a ring gear and the means associated therewith for preventing the adjusting cycle while the hub and cam shaft are in forward or braking position and having the slidable pin disassociated therefrom;

Fig. 12 is a view similar to Fig. 11 showing the pin associated with the ring gear;

Fig. 13 is a fragmentary view partly in elevation and partly in section showing the pin associated with the ring gear;

Fig. 14 is a view in perspective of the cover assembly;

Fig. 15 is a view of the cover assembly of Fig. 14 showing the opposite side thereof;

Fig. 16 is a vertical sectional view taken substantially along the line 16—16 of Fig. 15; and Fig. 17 is a vertical sectional view taken substantially along the line 17—17 of Fig. 15.

The invention will be more readily understood by referring to the drawings in detail wherein, in the several views, the same numerals or characters all denote the same parts.

In Fig. 1, there is more or less diagrammatically shown the two arcuate brake shoe portions 18 and 19 which, as understood, have applied thereto any brake lining or other friction surface. The opposite end portions 20 and 21 of the brake shoes are usually flattened to provide flat surfaces which are spacedly opposed to each other and, inbetween the same, the brake operating cam 22 is positioned. This cam is usually at the outer end of cam shaft 23 which supports and carries the same, while the other end of this cam shaft is suitably formed with longitudinally extending splines 24. Ordinarily, there is a retractible coil spring 25 which normally tends to urge the brake shoes 18 and 19 toward each other. A suitable air chamber 26 has the usual power operating arm or piston rod 27 extending longitudinally outwardly therefrom.

The brake shoes, cam and cam shaft and the power operating air cylinder 26, with its power operating arm 27, are conventional braking elements in a conventional braking system or systems for automotive vehicles.

My automatically operating brake adjusting mechanism or device is generally indicated at 28 and, as will be seen from the several figures of the drawings, it is mounted on and carried by the splined end 24 of the cam shaft 23. The device consists of a hollow casing generally denoted at 29 and this casing is of two parts or split and includes a main casing portion 30 and a casing closure portion 31, each of which is hollow and contain the hereinafter mentioned component and cooperating elements.

The hollow main portion of the casing has a centrally disposed opening 32 in a longitudinal end wall 33 thereof and a cylindrical interior wall 34 and has an open end 35. The lower portion 36 of the casing 30 tapers and is provided with an interiorly screw threaded opening 37 and the upper portion of the casing has integral therewith an upstanding, substantially flat and rectangularly shaped arm 38. This arm, adjacent but inwardly of its extreme upper end 39, is provided with a series of transversely spaced interiorly threaded openings 40, which openings 40 are adapted to receive therein the end portions of exteriorly screw threaded headed bolts 41, which headed bolts extend through transversely spaced openings 42 in the lower portion of an adjustable or interchangeable auxiliary arm 43 and the said bolts 41, therefore, adjustably secure the auxiliary arm 43 to the arm 38. As shown in Figure 4, there are three openings 40 in the arm 38 which are threaded as shown in Figure 2 and three openings 42 in the arm 43. Two of the openings in the arm 43 are substantially arcuate in form whereas the opening between these two is circular, the arcuate openings thus, when the bolts 41 are backed away, allowing for a pivotation of the arm 43 on its center bolt and a consequent adjustment due to the arcuate slots or openings and, of course, the bolts 41 secure this auxiliary arm in any desired adjusted position. The auxiliary arm 43 is for the purpose of adjustment for the relief of tight brakes which might occur and is hereinafter more specifically referred to.

Adjacent the upper end of the auxiliary arm 43 there is preferably a single opening 44 and which opening may have a bearing or bushing 45 therein. This opening serves as a means of securing the outer end 27ª of the power arm 27 to the auxiliary arm 43 and this is accomplished by means of a bolt 46 having a nut 47 thereon, the bolt extending through an opening 48 in the end 27ª of the arm 27 and the bushing 45 in the opening 44 in the auxiliary arm 43.

The main casing 30 inwardly of the opening 35 at one side thereof is reduced in circumference and thus forms a shoulder 49. The closure portion 31 which completes the casing structure includes a generally circular flange 50 and an interior shoulder 51, and the bottom thereof 50¹ is tapered and complemental to the outline and tapering of the lower portion of the main casing and is provided with an opening 50a which registers with the screw-threaded opening 37 in the bottom portion of the main casing, and a suitable exteriorly screw threaded bolt E serves to secure or lock or maintain the closure section of the casing in a fixed relationship with regard to the main portion 30 of the casing 29. The dimensions of the reduced end portion of the main casing and the shoulder formation of the cover portion of the casing are such that when the two are telescoped together, there is provided a snug and relatively tight friction fit therebetween, and these two portions of the casing are brought together by a sliding relationship and also separated from each other by a similar, but reverse, sliding relationship. In other words, the closure portion of the casing is merely slipped onto the reduced end portion of the main part of the casing as is clearly obvious from several figures of the drawings such as Figs. 2, 5 and 6.

The closure portion 31 of the casing includes a curved and substantially flat lever arm 52 which, at its lower portion is substantially circular and ring-like as denoted at 53 and is provided with a centrally disposed opening 54 in the said central portion thereof, and the lever arm 52 and the circular portion, of course, are integral. The circular portion of the lever arm 52, adjacent the opening 54, has a relatively short segment 55 welded thereto, which segment extends outwardly therefrom, the welding being indicated at 56. This segment 55 has suitable spaced bores 57 therein, which bores are adapted to receive and support coil springs S, a portion of which springs project beyond the face 58 thereof and, too, this segment 55 includes a recess or aperture 59 hereinafter described in detail.

Superimposed on the lever arm 52, there is an adjustment plate 60. This plate is generally flat and circular and includes an opening 61 which registers with opening 54 in the lever arm 52 and is of substantially the same diameter and the plate 60 has a lateral flat extension 62 integral therewith. This lateral extension has a substantially arcuate slot 63 therein and is maintained in adjusted position by means of an exteriorly screw threaded bolt 64 having a nut 65 thereon and which bolt extends through a circular opening 66 in the lever arm 52 and, of course, through the arcuate slot 63 in the extension 62 of the plate 60. Another segment 67, complementing and cooperating with the first segment 55, is fixedly secured to the plate 60 as by welding 68 adjacent the opening 61, see Fig. 17. The segments 55 and 67 are disposed within the closure assembly of the casing, see Figs. 3, 14 and 15, and, as stated, the segment 55 is fixedly secured to the lever arm 52 or the circular portion 53 thereof and this segment is relatively small as compared with the other segment 67. This segment 67 is fixedly secured to the adjusting plate 60 and both of the segments are adjacent the openings in the respective elements to which they are fixedly and permanently secured.

The lever arm 52 has an elongated slot 69 therein adjacent its free end and this slot serves as a means for adjustably connecting the arm 52 of the device 28 with a bracket 70 by means of a bolt 71 at one end of said bracket and the other end of the bracket 72 being bent over at substantially a right angle and secured by means of one of the bolts 73 which holds the cover or face of the pressure cylinder in its position. This bracket may be secured to any other suitable fixed part of the vehicle. This bracket 70 thus serves to fixedly secure and hold the arm 52 of the device but, yet, due to the elongated slot 69 therein, an initial adjustment may be obtained when the device is first installed on the vehicle.

As regards the segments 55 and 67, it will be noted that each of the same are undercut as at 74 and, as specifically relating to the segment 67, this undercut formation which rests over the flange portion 75 of the closure, serves as a means to allow this larger segment 67 to be moved or rotated relative to the fixed segment 55 when, of course, the bolt 64 has been loosened slightly so as to allow the plate 60, which has the segment 67 secured thereto, to be moved by pressure on the laterally extending portion 62 or on the circular portion 60, if desired, to thereby move the abutment end 67a thereof toward or away from the abutment end 55a of the segment 55 and providing for a variation of the space between these two abutments or abutting surfaces for a purpose later described.

A circular collar 76 having ratchet teeth 77 and 78 on opposite faces or sides thereof and constituting a double faced ratchet gear is affixed to or is integral with a cylindrical hub 79. From Figs. 2 and 7, it will be noted that the collar or ratchet gear 76 extends circumferentially around or about the hub 79 adjacent a short extending end 80 thereof and the other end 81 of the hub is relatively long as compared with the end 80. There is a circumferential groove 82 formed in the long end 81 of the hub 79 adjacent the extreme end 83 thereof and the interior of the hub is provided with circumferentially spaced longitudinally extending splines 84 which are adapted to engage in the channels between the splines 24 at the end of the cam shaft 23. The hub 79 carrying the ratchet gear 76, it is understood, is affixed to the end of the cam shaft by means of the complemental splines and, of course, this ratchet gear moves or rotates with the cam shaft when the device is positioned thereon. The ratchet gear and the hub are disposed interiorly of the casing, as shown, and the short end extension 80 of the hub extends outwardly through the opening 32 in the wall 33 of the main casing and the inner surface of this wall 33 has formed thereon or attached thereto a circular series of teeth 85 similar to the teeth 77 on the ratchet gear 76 and with which teeth 77 the teeth 85 mesh or engage and disengage at times.

A circular ring 86 is concentrically disposed about the portion 81 of the hub 79 and this ring has a laterally extending projection 87 extending from one side portion thereof, and this projection has therein a socket or recess 88 facing toward the teeth 78 of the ratchet gear, and disposed in this socket or recess, there is a detent 89 that is normally spring urged outwardly by means of a coil spring 90, a portion of which is in a recess 91 in the detent and another portion of which is disposed in a recess or socket 94 in the projection 87, as shown in Figures 6 and 7. The detent is of such dimensions that it is freely slidable in the said recess or socket in the projection 87 and the outer face thereof is formed with ratchet teeth 93 which are adapted to mesh or engage and disengage with some of the teeth 78 of the ratchet gear 76. Also, as will be seen from Fig. 7, and several of the other figures of the drawing, the arcuate segments 55 and 67 that are carried by the closure portion of the casing, and when the latter is attached to the main casing, also are concentrically disposed about the long portion 81 of the hub 79 and the coil springs S of the segment portion 55 and the similar coil springs S¹ that are mounted in sockets or recesses 94 in the segment 67, engage the inner face 95 of the ring 86 and urge this ring toward the ratchet teeth 78 and the detent carried by the ring into engagement with the ratchet teeth 78 or some of these teeth. The projection 87 that is integral with the ring 86 is disposed between the abutments 55ᵃ and 67ᵃ and, as the abutment 67ᵃ is movable relative to the abutment 55ᵃ, the space between these two abutments, as aforesaid, can be varied and the movement of the projection 87 that is between these abutments is therefore varied or limited.

When the cover assembly as shown in Figs. 3, 14 and 15, is associated with the main casing as disclosed in Figs. 2, 5, 6, 7, 9 and 10, it will be seen, that the hub and the ratchet gear are disposed within the main casing and within the cover assembly, and that the teeth 77 will be in engagement with the teeth 85 which are integral with the interior of the main casing and disposed about the opening therein at one end and the teeth 93 of the detent 89 are in engagement with several of the teeth 78 of the ratchet gear and that the projection 87 is disposed between the abutments 55ᵃ and 67ᵃ and that the springs carried by the segments, one of which is adjustable, urge all of the aforesaid teeth into engagement with each other and that the spring for the detent likewise urges it into engagement with several of the teeth 78 of the ratchet gear. The cover assembly 31, as aforesaid, is slipped onto the main casing or about one end thereof and, when the device is positioned on the end of the cam shaft, a sealing ring 96 which is preferably of the split ring type used upon pistons is disposed in the circumferential groove 82 on the hub and the extreme end of the hub adjacent where it is grooved 83 projects slightly beyond or outwardly of the plate 60 that is carried by and a part of the cover assembly. The device is maintained on the shaft 23 by means of a reduced threaded extension 97, either integral with or otherwise secured to the extreme end of the cam shaft, and a simple washer or retainer 98 and the nut 99, see Figs. 2, 7, 9 and 10. Other means, of course, may be utilized and resorted to for maintaining the device on the shaft.

It will be noted that, where the circular portion 53 of the lever arm 52 engages the end closure denoted specifically at C, there is formed a circumferentially extending groove 100 and, to effect a seal between the closure and the plate and the interior of the main casing, a suitable compressible resilient and flexible gasket 101 is disposed in the groove 100, and, of course, the split ring 96 also serves to seal the front portion of the device to maintain the lubricant, not shown, therein and, along with the seal 101, prevent the entrance of water, dust or other deleterious matter.

The opposite extreme end portions 80 and 83 of the hub 79, as already stated, project slightly beyond the opposite sides of the device as a whole and this, with space 102, allows for an axial movement of the casing or device, at requisite times, relative to the ratchet gear so as to allow or prevent an indexing of the ratchet gear or, stated another way, to allow an adjustment of the brake bands, if necessary, or prevent such an adjustment as later described.

One important feature of the invention is the provision of the apertured recess or opening 59 in the face portion of the relatively short segment 55 and the headed pin or stud P that is secured to and carried by the ring member 86 adjacent to the projection 87. In referring to the drawings, particularly Figs. 5 and 6, it will be seen that this stud or pin P which has an enlarger head projecting beyond the inner face of the ring 86, is such that when the head is disposed directly opposite the recess or opening 59, a disengagement of either of the sets of engageable teeth 85 and 77 or 93 and 78 may be effected, where in this position, the enlarged head will be allowed to enter into the opening or recess 59 and, thus, the space 102 that exists between the inner face 95 of the ring 86 and the outer or opposing face 104 of each of the segments 55 and 67 will be closed but, when the head of the pin or stud P is in contact with the outer face 104 of the segment, or rather a portion thereof, as shown in Fig. 6, the space 102 is thereby maintained, and the aforesaid sets of gear teeth, therefore, cannot be disengaged or brought out of mesh with each other except at such times that the brake lining is worn and the auxiliary arm 43 travels farther in applying the brakes. In this case, hub 79 with the ratchet 76 will likewise rotate more. As projection 87 is against the abutment end 67ᵃ segment 67 and, therefore, is prevented from further rotating movement, and as hub 79 continues to rotate, the teeth on detent 89 and the teeth 78 on the ratchet 76 will disengage, and as arm 43 and hub 79 rotate an increased amount as the lining wears, hub 79 will eventually rotate an additional amount so as to permit teeth on detent 89 and teeth on ratchet 76 to re-engage but in such position in relation to each other that hub 79 cannot return to its former position but is rotated by the space of one tooth. Thus, the brakes are adjusted.

The modification or variation of the invention as disclosed in Fig. 9 through Fig. 13, inclusive, is similar indeed to the hereinbefore described invention. The difference in the modification or variation of the invention resides in the fact that, instead of providing the spring pressed detent 89, the gear teeth 93ᵃ of the ring 86 are continuous and function in the same manner as the detent teeth 93. Further, in Figs. 9 through 11, the stud or pin P¹ is headed and includes a shank portion 105 which is adapted to be slidably engaged and maintained in the opening 106 whereas the headed portion 107 is adapted to be seated in a recess 108 formed in a face portion of the toothed ring 86. In the operation of the device as depicted in Figs. 9 through 13, the pin P¹, when teeth 93ᵃ of the ring 86 and teeth 78 of the ratchet gear are engaged, thus serves to project the extreme end portion of the shank 105 slightly outwardly of the inner face 95 of the gear ring 86 but projecting into and an amount approximately equal to space 102. When this extreme outer end is over the recess 59 in the face of the segment 55, this extreme outer end can be projected into the said recess from the position shown in Fig. 9. However, when the said teeth 78 and 93ᵃ are in mesh or engaged and the component elements of the device are in the position shown in Fig. 10, this extreme outer end portion of the stud or pin P¹ will ride on the face portion 104 of the segment 55 and thus prevent the disengagement or unmeshing of these teeth 77 and 85, but, by the comparatively loose sliding fit between pin 105 and the hole 106 in ring 86, said ring 86 with teeth 93ª can disengage from and reengage with the teeth 78 on the hub at any time thus closing the space 102 in so doing.

When the adjuster is in the forward or braking stroke, the pin 105 is in position so as to prevent the teeth 77 from disengaging from teeth 85. With the adjuster in the released position, pin 105 is superimposed over the opening in the ring. If no brake adjustment has occurred on the previous forward or braking stroke, pin 105 does not enter hole 59 in the ring segment 55. However, if adjustment of the brakes has occurred on the previous braking stroke, teeth 77 and 85 must disengage and reengage to complete the adjusting cycle. This disengagement can now occur as, with the axial movement of the case and teeth 85 in relation to hub 79, the pin 105 will enter opening 59. It will be seen that disengaging teeth 77 and 85 is prevented on the forward stroke, and if the cam shaft fails to return, the adjuster case will also remain in the forward position and will not return prematurely to cause a false brake adjustment.

The ring gear 86 as depicted in Figs. 9 through 12 has the laterally extending projection 87 integral therewith and this projection, of course, performs and is positioned between the abutments 67ª and 55ª in the same manner as hereinbefore described.

The automatically operating brake adjusting devices hereinbefore described, and as shown in the drawings, operate substantially as follows: When the brakes are to be applied, due to the expansion of the brake shoes 18 and 19, air is introduced into the air chamber 26 and the air produces an axial movement of the power shaft 27, and this shaft being connected to the auxiliary adjustable arm 43 of the device and the device being mounted on the cam shaft 23 and rotatable therewith, results in a rotation of the casing 30 of the device and the ratchet gear thus rotating the cam shaft 23 and the cam 22 carried thereby is thus rotated or partially rotated and the brake shoes 18 and 19 are expanded outwardly and the brakes applied. The movement of the air chamber shaft or piston rod 27 is limited and it is necessary that some means of adjustment must be provided so that the brakes will be applied without the air chamber expanding to its utmost limit and the consequent axial maximum movement of the air chamber shaft 27. The working stroke of the air chamber shaft is stopped when the expansion of the brake shoes carrying the lining thereon is terminated by the limits of expansion within or against the brake drum. Obviously, as the brake lining wears, the brake shoes 18 and 19 are allowed to expand further outwardly and the cam shaft 23 and the adjusting mechanism having a further movement of rotation and the shaft 27 thus moves nearer its limit of travel. As this greater movement or limit of travel of the adjusting mechanism takes place, the wearing of the lining permits the stroke of the shaft 27 to increase until it reaches a predetermined point where the adjusting cycle of the device occurs. In adjusting, the cam shaft 23 is rotated in the proper direction to tighten the brakes and the working stroke of the shaft 27 is made shorter.

The movement of the air chamber shaft 27 causes the arm 43 and the casing 30 to rotate. The end closure or wall of the casing 30 has a circular series of teeth 85 thereon and these teeth 85 being in engagement with a set of similar teeth 77 on the ratchet gear 76 thus cause the hub 79 on which the ratchet gear is mounted to rotate with the casing and the arm 43 at certain times. As already stated, this hub which carries the ratchet gear is mounted on the cam shaft and rotates or moves therewith and rotative movement of the hub on the cam shaft is prevented by the splined connection therewith. It is clear, therefore, that as the adjuster arm 43 is moved by the shaft 27, the cam shaft is rotated and the brakes are applied and, upon release of the air pressure, the air chamber shaft 27 is retracted and the adjuster and cam shaft rotate back to the starting position and, consequently, the brake shoes carrying the brake lining collapse slightly and the brakes are released.

When the brakes are applied by expanding the brake shoes 18 and 19, the cam shaft is consequently rotated as far as the expansion of the shoes and the lining carried thereby within the drum will permit. The ring 86 is rotated with the hub and the projection 87 moves in the space denoted at X in Figures 9 and 10 between the abutments 55ª and 67ª at the ends of the segments 55 and 67 respectively.

With the brakes applied, the projection 87 or one wall thereof will be in contact with the abutment 67a of the segment 67 and further rotative movement of the ring 86 is thus prevented. If the brakes are in proper adjustment, the adjuster, including the hub 79, will not rotate farther but will, upon release of the pressure in the air chamber, return to the released or starting position. If, however, the linings on the brake shoes 18 and 19 are worn, the adjuster will rotate somewhat farther and, in this instance, the hub 79 will, of course, also rotate somewhat farther. As the ring 86 moves with the detent 89, as shown in Figs. 9, 10 and 11, is prevented from further rotative movement by the projection 87 thereof contacting with the abutment 67a on the segment 67, and which abutment is held stationary, and the hub 79 rotates farther, the teeth 78 of the ratchet gear and the teeth 93 of the detent 89 or the teeth 93ª will tend to separate when the lining is worn and the adjuster advances to the point of adjustment. In this case, the teeth 93 on the detent 89 or the teeth 93ª will disengage fully from the teeth 78 of the ratchet gear on the hub and reengage with teeth 78 on the ratchet gear, and this movement will result in the hub 79 being rotated an amount equal to one tooth and in a direction in which the brakes are applied. The hub is held in this new position and the cam shaft accordingly is rotated a like amount and the brake shoes 18 and 19 will, therefore, be in closer adjustment with the brake drum. Upon return of the adjuster to the starting or released position, the ring 86 will rotate until contact is made between the wall of the projection 87 and the abutment 55a at the end of the segment 55. As the hub 79, with the ratchet gear 76 thereon, and the teeth 77 and 78 have been advanced in the amount of one tooth, it will be seen that they will remain in the advanced position, being held thus by the teeth 93 of detent 89 or the teeth 93ª of the ring 86 in engagement with teeth 78 of the ratchet gear. If the teeth 85 which are within the casing, were to remain in engagement with teeth 77 of the ratchet gear, full return of the adjuster and the air chamber rod 27 would be prevented. Therefore, as the hub 79 and the teeth 78 on the ratchet gear are held in position and the teeth 85 are inclined to continue to move fully into the released position, teeth 85 and 77 will disengage and the adjuster and teeth 85 will continue to move a distance equal to one tooth at which point they will reengage and the adjusting cycle is completed.

The casing 30 is adapted for axial movement relative to the cam shaft 23 and this axial movement is permitted by the space 102 between one face of the ring 86 and the opposing face 104 of the segments 55 and 67, and thus, the springs S and S' carried by the segments and the spring 90 are compressed but these springs will urge the remeshing or reengagement of the teeth 93 of the detent 89 or the teeth 93ª of the ring 86 with the ratchet gear teeth 78 upon completion of the adjusting cycle.

In certain cases, in the braking stroke, the cam shaft 23 will tend to stick or bind and fail to return to the original or released position and, thus, it is necessary to provide means for preventing the return or indexing of the adjuster mechanism or device to the released position until the cam shaft also returns. If the cam shaft does not return to its original position and the adjuster is permitted to return to its original position, it will index one or more times, the same as occurs for worn lining, and this false adjustment, therefore, will result in the brakes being too tight or tightened to such an extent as to prevent movement of the vehicle. To prevent the return of the adjusting mechanism or device when the cam shaft fails to return, I provide the pin or stud P or the pin or stud P¹.

As regards the pin or stud, in both modifications or variations of the invention, and as shown in Figs. 5 and 9, the same is directly over the recess 59 in Figs. 5 and 9, and in these two said figures, the adjusting mechanism is in released position and disengagement of teeth 77 and 85 is possible. In this disengagement the space 102 between the opposing faces of the ring 86 and the segments 55 and 67 is closed and the head of the pin or stud P, in Fig. 5, or the extreme end of the stud or pin P¹, in Fig. 9, enters the recess or opening 59 in the face of the segment 55. In Figs. 6 and 10 of the drawings, the ring 86 and consequently the pins P and P¹ are in the advanced or braking position. It is in this braking position that indexing of teeth 77 and 85 must be prevented, meanwhile permitting indexing of teeth 78 and 93ª or 93 on the detent 89, as required. The teeth 77 and 85 cannot disengage at this point as the headed pin or stud P or the stud P¹ is not over the recess or opening 59 in the segment, but, to the contrary, is over and engages a solid face section or portion of the segment 55, thus preventing the closing the space 102, which closing of said space is necessary in the disengagement of teeth 77 and 85. The movement for disengaging and reengaging teeth 78 and 93 or 93ª is permitted by the pin or stud P¹ and the recess or opening 59, and this same principle applies in Figs. 5 and 6 where the pin P moves with the ring 86 and prevents closing of the space 102 between the face of this ring and the opposed faces of the segments 55 and 67, except in the released position as shown in Fig. 5, when the pin is directly opposite and eventually the end thereof is in the recess or opening 59.

The space R beneath the lower end of the detent 89 and the lower wall of the recess 87 in the projection permits disengagement of this toothed detent from the teeth 78 of the ratchet gear.

When the adjuster is installed on the vehicle, and preparations are made to attach the anchor strap or supporting bracket 70 and secure this bracket by means of the bolt and nut 71 to the lever arm 52, this arm 52 is moved rotatively in the same direction as the braking stroke as far as its free movement will permit, and is secured in that position. This results in moving the segment 67 forward and the abutment 67ª thereof is in contact with the projection 87 on the ring 86. This results in timing the adjusting cycle, which is necessary, otherwise the adjusting could possibly attempt to occur during the braking stroke and could not be completed because the working parts of the device are naturally under strain during the braking stroke. This timing is necessary for the efficient operation of the adjuster mechanism. It is understood that the slot 69 in the arm 52 enables the device to be properly attached to the supporting bracket 70 and, further, that in lieu of the supporting bracket 70, any other means for supporting or attaching the lever arm to the vehicle may be utilized.

It is to be understood that the dimensions of the peripheries of the ratchet gear 76 and the ring gear 86 and the segments 55 and 67 are such that there is a slight clearance between the same and the interior adjacent wall of the main casing so as to allow the proper movement of these elements within and relative to the casing, such movement being either rotative or axial. In other words, the tolerances of these elements within the casing with regard to the diameter of the interior thereof are such that the elements and the casing will be allowed their proper movements as hereinbefore described.

In both modifications of the invention, the dimensions of the space 102 is such that simultaneous disengagement of the cooperating sets of gear teeth 85, 77 and 78, 93 or 78, 93ª is prevented. In other words, at no time can both of the aforesaid sets of teeth be disengaged or unmeshed, assuming, of course, the component elements are disposed and maintained in the casing and in their cooperating and operative relationship therein.

The device operates the brakes of the vehicle in the normal operation of such brakes, and also automatically adjusts the brakes, as hereinbefore explained.

I claim:

1. A fully automatically operating slack adjusting device comprising a two-part hollow casing, an elongated hub carrying a circumferential ratchet gear with teeth on opposite side faces thereof disposed in the casing, the casing having end walls formed with centrally disposed aligned openings through which respective end portions of the hub rotatably fit, the hub being adapted to be positioned about an end portion of a shaft and fixed thereon to turn therewith, the casing having a series of teeth integral with one end wall thereof and arranged in a circular path concentric with the opening therein and which teeth are adapted to mesh with and disengage from the teeth on the confronting side face of the ratchet gear, a ring gear fitting loosely about said hub concentric therewith and disposed within the casing at the opposite side of the ratchet gear from the toothed end wall of the casing, said ring gear having a side face formed with teeth that are adapted to mesh with and be disengaged from the teeth on the confronting side face of the ratchet gear, spaced segments disposed in said casing and having a yieldable cooperation with the ring gear, one of the segments being rigid with an adjusting place rotatably mounted for turning movement in the casing and about the hub to adjusted positions, said segment having spaced ends and being rotatable about the hub with the adjusting plates to adjusted positions, the other segment being stationarily mounted within the casing and located in the space between ends of the adjustable segment and being of appreciably less length than the space into which it fits, confronting faces at ends of the segments constituting abutments limiting movement of the adjustable segment, the ring gear having an integral projection thereon and which projection is disposed in the space between the abutments, and a member carried by the ring gear and adapted to cooperate with the fixed segment for preventing the adjusting cycle of the brake adjusting mechanism when the hub and the cam shaft are in the braking position.

2. A slack adjuster as defined in and by claim 1 wherein an adjusting member is rotatably mounted exteriorly of and closely adjacent the casing, the adjustable segment being rigid with said adjusting member and movable thereby to adjusted positions relative to the stationary segment upon movement of said adjusting member.

3. A fully automatic slack adjusting device adapted to be attached to the end of a cam shaft, said device comprising a substantially hollow casing and a detachable closure for one end thereof, the other end of the casing having a head and a series of teeth carried thereby within the casing and arranged in a circular path concentric with the casing, an elongated cylindrical hub disposed in rotative relationship within the casing and having the opposite ends thereof extending through and beyond the head of the casing and the closure for the casing, the hub being adapted to be mounted on an end of a cam shaft to turn therewith and carrying a circumferential ratchet gear with teeth on opposite side faces thereof, a ring gear of substantially the same circumferential dimensions as the ratchet gear loosely mounted about the hub at the opposite side of the ratchet gear from the head of the casing and having a side formed with teeth adapted to mesh with the teeth on the confronting side face of the ratchet gear, the teeth on the other face of the ratchet gear being adapted to engage the teeth carried by the head of the casing, a pair of segments also concentrically disposed about the hub within the casing and located between the ring gear and the closure for the casing, spring means interposed between the segments and the confronting side face of the ring gear to normally urge the latter into meshed relationship with the ratchet gear, one of the segments being disposed between spaced ends of the other and of a length appreciably less than that of the space in which it fits and permitting movement of one segment relative to the other to adjusted positions, each segment having opposed end faces which constitute abutments and limit movement of the movable segment relative to the other segment, the ring gear having a laterally extending projection integral therewith and which projection is disposed in the space between the abutments of the two segments, means exteriorly of the casing but in close relationship therewith and fixedly connected with the movable segment within the casing so that this said segment may be moved toward or away from ends of the other segment which is stationary and thus vary the space between the abutments at the ends of the segments, whereby the movement of the device and the projection extending into space between the abutments may be varied to effect the proper adjustment of the slack.

4. A slack adjusting device as defined in and by claim 3 wherein a stud is carried by the ring gear member and which stud projects beyond one side face of this ring gear and prevents indexing of the gear teeth of the ratchet gear and the ring gear under unsatisfactory conditions but which allows for indexing and adjustment automatically of the slack when adjustment of slack is necessary.

5. A fully automatic slack adjusting device comprising a hollow two-part casing, one of which parts thereof serves as a closure for the other part, and companion ratcheting toothed members capable of meshing and unmeshing with each other disposed within the hollow casing, an operating shaft to which one of which members is adapted to be attached and move therewith, the casing having a laterally extending integral arm to which an adjustable auxiliary arm is pivotally connected by releasable fastener means permitting the auxiliary arm to be tilted to an adjusted position relative to the arm of the casing and releasably secured in the adjusted position.

6. A slack adjusting device as defined in and by claim 5 wherein the auxiliary arm is pivotally attached to the stationary arm of the casing and has arcuate openings therein, and bolts carried by the stationary arm and extending through the arcuate openings for maintaining the auxiliary arm in any predetermined adjusted position relative to the stationary arm.

KIRKLAND B. MacDOUGALL.

References Cited in the file of this patent

UNITED STATES PATENTS

| Number | Name | Date |
| --- | --- | --- |
| 2,156,154 | Hooker | Apr. 25, 1939 |
| 2,347,186 | Freeman | Apr. 25, 1944 |
| 2,385,621 | Freeman | Sept. 25, 1945 |
| 2,481,319 | MacDougall | Sept. 6, 1949 |
| 2,522,903 | Shively | Sept. 19, 1950 |